United States Patent
Lekson

(10) Patent No.: US 6,190,027 B1
(45) Date of Patent: Feb. 20, 2001

(54) ELECTROLUMINESCENT COURTESY LIGHT WITH OPTICAL ELEMENT AND TUBE FOR RUNNING BOARD OF VEHICLE

(75) Inventor: Matthew Andrew Lekson, Farmington Hills, MI (US)

(73) Assignee: North American Lighting, Inc., Farmington Hills, MI (US)

( * ) Notice: Under 35 U.S.C. 154(b), the term of this patent shall be extended for 0 days.

(21) Appl. No.: 09/253,643

(22) Filed: Feb. 19, 1999

Related U.S. Application Data
(60) Provisional application No. 60/075,437, filed on Feb. 20, 1998.

(51) Int. Cl.$^7$ ............................................. B60Q 1/32
(52) U.S. Cl. ......................... 362/495; 362/84; 362/544; 362/311; 362/333; 313/512
(58) Field of Search ..................... 362/495, 511, 362/543, 544, 509, 311, 333, 326, 313, 84

(56) References Cited

U.S. PATENT DOCUMENTS

| | | | |
|---|---|---|---|
| 4,134,007 | * 1/1979 | Koreicho et al. | 359/172 |
| 4,463,962 | 8/1984 | Snyder | 280/164.1 |
| 4,544,991 | * 10/1985 | Gorsuch | 362/495 |
| 4,557,494 | * 12/1985 | Elwell | 362/495 |
| 4,819,136 | 4/1989 | Ramsey | 362/495 |
| 4,864,473 | 9/1989 | Tokarz et al. | 362/490 |
| 4,965,704 | 10/1990 | Osborne, Sr. | 362/495 |
| 4,985,810 | 1/1991 | Ramsey | 362/495 |
| 5,117,338 | * 5/1992 | McCrary | 362/104 |
| 5,323,300 | * 6/1994 | McCrary | 362/104 |
| 5,641,221 | * 6/1997 | Schindele | 362/80 |
| 5,915,830 | * 6/1999 | Dickson et al. | 362/495 |

* cited by examiner

Primary Examiner—Alan Cariaso
Assistant Examiner—Ronald E. DelGizzi
(74) Attorney, Agent, or Firm—McDonnell Boehnen Hulbert & Berghoff

(57) ABSTRACT

The present invention is directed to a lighting device to illuminate the running board of a vehicle. One embodiment of the lighting device includes an electroluminescent element from which light emanates, an optical element for focusing the light, and a transparent tube surrounding the electroluminescent element and the optical element. In another embodiment of the lighting device, the transparent tube itself is provided with optical power for creating the desired light pattern.

12 Claims, 2 Drawing Sheets

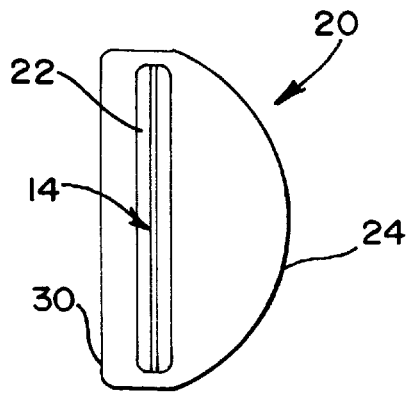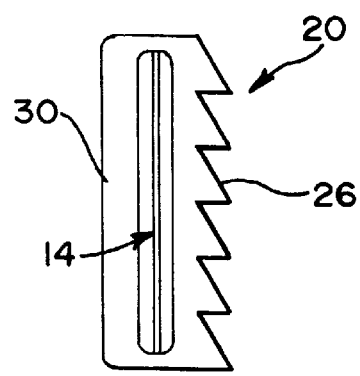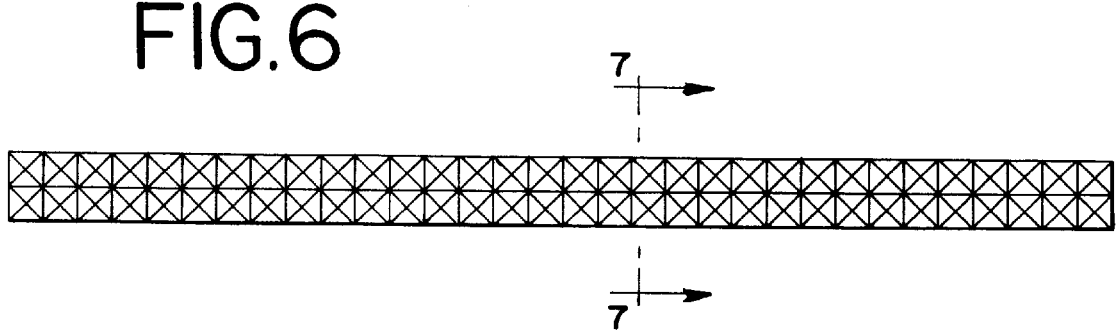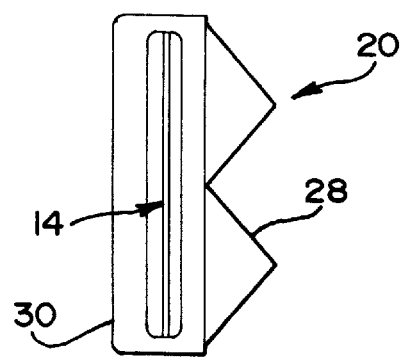

ELECTROLUMINESCENT COURTESY LIGHT WITH OPTICAL ELEMENT AND TUBE FOR RUNNING BOARD OF VEHICLE

CROSS-REFERENCE TO RELATED APPLICATION

This application claims priority from U.S. Provisional Patent Application Ser. No. 60/075,437 filed on Feb. 20, 1998.

TECHNICAL FIELD

This invention relates to the art of lighting for automobiles. In particular, the invention relates to the use of electroluminescent devices for illuminating areas on or closely adjacent to an automobile.

BACKGROUND

Lighting devices that utilize electroluminescent elements are well known. These devices generally include an electrically conductive substrate with an electroluminescent coating for generating light when electric current is passed through the substrate. Prior electroluminescent devices are typically used as illuminated elements in a display, such as in a sign or an electronic instrument. It is known also to use an electroluminescent element in combination with a diffuser for interior lighting in automobiles, as shown in U.S. Pat. No. 4,864,473.

The lighting devices of the prior art, however, lack an optical means for shaping or directing the light in a desired beam pattern. When illumination is required for a specific area, the devices of the prior art are unable to direct light to that specific area. Thus, there is a need for a lighting device to illuminate portions of an automobile or areas immediately adjacent the automobile such that light generated by the device is directed to the area where illumination is needed.

SUMMARY OF THE INVENTION

In accordance with the invention, electroluminescent devices are used for illuminating portions of an automobile or areas immediately adjacent the automobile. The electroluminescent device is mounted on the automobile such that light generated by the device is directed to the area to be illuminated. In the preferred embodiment, elongate electroluminescent devices are mounted on the automobile for illumination of the horizontal surface of a running board. As well, the elements may be attached to the running board for illumination of the ground adjacent the running board for illumination of obstacles to be avoided, such as puddles. In the case of an automobile without a running board, the electroluminescent device may be mounted in the interior of the automobile to illuminate the ground when the door is opened, or on its exterior.

In one specific embodiment, one or more of the electroluminescent devices are placed on a vertical kick plate adjacent the horizontal part of the running board for illumination of the horizontal surface onto which the user steps. In another specific embodiment, a separate electroluminescent device is mounted below the running board for illuminating the ground beneath the running board.

In each of these embodiments, one or more electroluminescent elements are combined with structure that facilitates mounting the elements to the automobile, protects the elements, and modifies the light generated by the element to provide the desired pattern. For example, the electroluminescent element may be placed inside a transparent tube for protecting the element from the environment, abrasion, etc. Further, the element may be combined with an optical element, such as a cylindrical lens for focusing the light into the desired pattern. In other embodiments, the transparent tube itself is provided with optical power to shape or direct the light, thereby creating the desired light pattern.

BRIEF DESCRIPTION OF THE DRAWINGS

FIG. 4 is a transverse cross section of a second embodiment of a device in accordance with the invention.

FIG. 5 is a transverse cross section of a third embodiment of a device in accordance with the invention.

FIG. 6 is a front view of a fourth embodiment of a device in accordance with the invention.

FIG. 7 is a transverse cross section of the device shown in FIG. 6 taken along line 7—7.

DETAILED DESCRIPTION OF THE PREFERRED EMBODIMENTS

Figure 1:
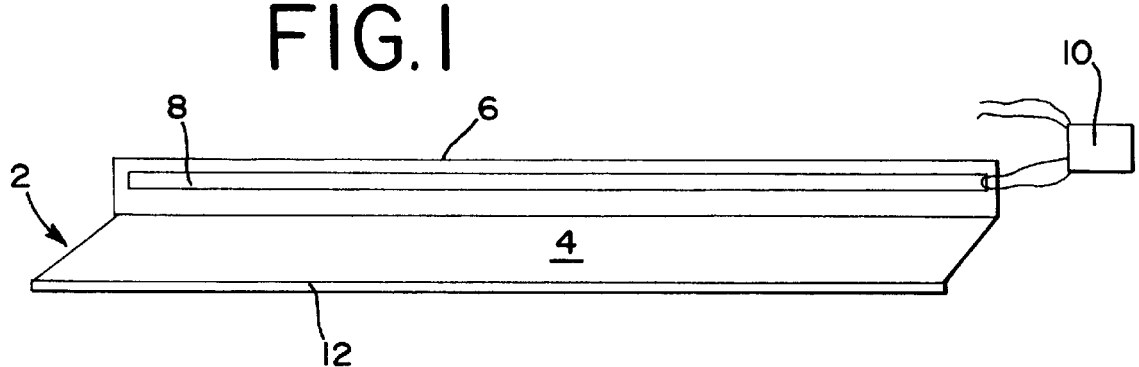
FIG. 1 is a perspective view of a running board having electroluminescent devices thereon in accordance with the invention.

With reference to FIG. 1, a running board 2 of known construction includes a horizontal part 4 which serves as a step for a user, and a vertical part, or kick plate 6. This running board is attached to a vehicle, which has not been illustrated. At night or in other conditions of reduced natural light, a user of the vehicle often finds it difficult to see the step and thus has to locate it by feel. Thus, in accordance with the invention, the step is illuminated by a lighting device 8, which comprises an elongate strip electroluminescent element. The lighting device 8 is preferably long enough to extend along the length of the horizontal part 4 to illuminate the entire step. It may be made of a plurality of shorter elements, however. The electroluminescent elements of the lighting devices are powered by a power supply 10, which is, in turn, connected to the electrical system of the vehicle.

A second lighting device 12 may be attached to the front edge of the step for illumination of the ground adjacent the step. This lighting device is preferably secured just beneath the front edge of the step such that it is not apt to be engaged by the user's foot.

Figure 2:
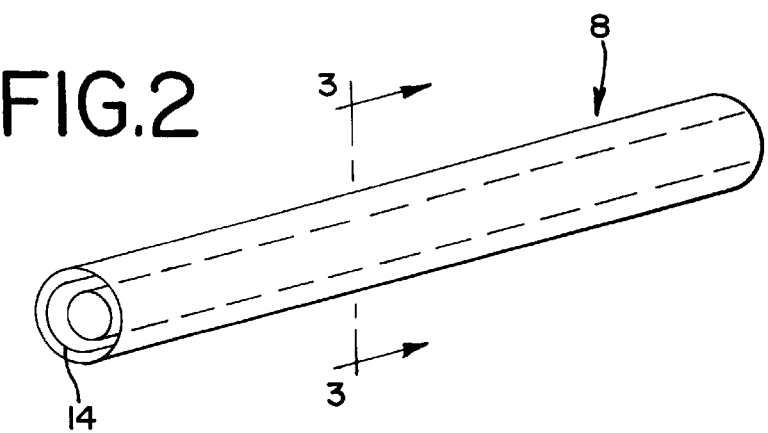
FIG. 2 is a perspective of an electroluminescent device in accordance with the invention.
Figure 3:
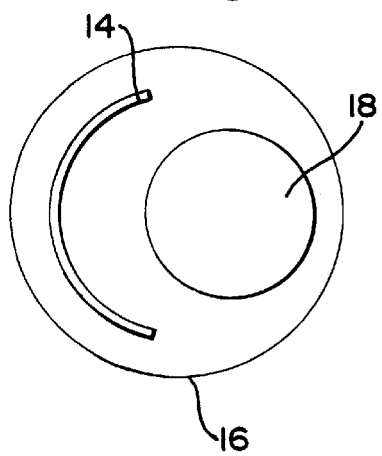
FIG. 3 is a transverse cross section of the device shown in FIG. 3 taken along line 3—3.

FIGS. 2 and 3 illustrate a preferred embodiment wherein the illuminating device 8 includes an electroluminescent element 14. This element is elongated and includes a conductive base and an electroluminescent coating as known in the art. Preferably, the element is made of parallel parts connected at one end so that the electrical connections are at an opposite end, as illustrated in FIG. 1. The element 14 is contained within a transparent tube 16, which may be made of any of a variety of known plastic materials and formed by extrusion. An optical element 18 is placed in the tube 16 in front of the element 14. The element 18 provides two functions. The primary purpose of the element 18 is to focus the light emanating from the electroluminescent element into the desired pattern for illuminating the step portion 4. In this regard, the element 18 may be cylindrical as shown, semi-cylindrical, or other shapes. A second purpose for the element 18 is to strengthen the device 8. Thus, the element 18 may be made of an acrylic material, poly-carbonate, or other materials that provide mechanical strength and acceptable optical properties.

The device 8 may be secured to a variety of locations on the automobile, such as a running board, in any of several manners. For example, the device may be attached by clips spaced evenly along the device and attached to the step or vertical portion of the running board. As well, the device may be cemented to the step. As noted above, the step or vertical part can be provided with a groove for receiving the element to facilitate mounting.

FIGS. 4 through 7 illustrate further embodiments of the invention wherein an elongate element is provided with optical power on its front surface and a cavity for receiving the electroluminescent element. Thus, with reference to FIG. 4, a transparent, or in some cases translucent, elongate element 20 is provided with a cavity 22 for receiving the electroluminescent element 14. The front surface 24 of the element 20 is provided with a cylindrical optical surface whereby the light emanating from the electroluminescent element is transmitted through the element 20 and refracted by the front surface 24 to a desired light pattern. For example, the dimensions and refractive properties of the element 20 can be arranged such that the light is distributed across a running board or onto the ground to illuminate the area onto which a passenger would step.

FIG. 5 illustrates another embodiment where the front surface is a series of elongate, parallel prisms 26 that direct the light in a desired pattern and increase the light intensity.

FIGS. 6 and 7 illustrate yet another embodiment. In this embodiment, the front surface of the element 20 includes diamond shapes 28 for redirecting the light.

The rear surface 30 of the element 20 may be shaped as shown to facilitate mounting on a flat surface, or it may have other shapes to facilitate mounting on surfaces of other shapes. As well, the rear surface could be provided with optical power to allow illumination of an area on the rear of the element 20. In that case the electroluminescent element would be arranged to emit light in opposite directions, as by placing two elements back-to-back. The element 20 is shown straight, but it could be curved in any direction to allow illumination of various areas, such as the ground or other parts of the automobile.

It will be appreciated that the articles shown in FIGS. 4 through 7 may be made in a variety of ways. For example, the articles could be integrally extruded or molded, or made from separate elements made in any of several ways. The articles may also be any of several known materials such as clear or colored transparent plastics. Examples of such plastics include Acrylic (PMMA) and Polycarbonate.

Additional modifications will be apparent to those of skill in the art.

What is claimed is:

1. A lighting device for use with a vehicle comprising:
   an electroluminescent element from which light emanates;
   an optical element for focusing the light that emanates from the electroluminescent element;
   a tube surrounding the electroluminescent element and the optical element for protecting the elements;
   wherein the device is mounted adjacent to a running board of the vehicle.

2. The lighting device of claim 1 wherein the device is mounted beneath a running board of the vehicle.

3. The lighting device of claim 1 wherein the device is mounted on a vertical portion of a running board of the vehicle.

4. The lighting device of claim 1 used in combination with a second lighting device mounted on a horizontal portion of the running board.

5. The lighting device of claim 1 further provided with means for attaching the device to the vehicle.

6. A lighting device for use with a vehicle comprising:
   a tube having a front surface and a cavity for receiving an electroluminescent element;
   at least one electroluminescent element from which light emanates; and
   an optical power provided on the front surface of the elongate tube, the optical power focusing the light to a desired light pattern;
   wherein the front surface on which the optical power is provided is cylindrical in shape.

7. The lighting device of claim 6 wherein the front surface on which the optical power is provided includes a series of elongate, parallel prisms.

8. The lighting device of claim 6 wherein the front surface on which the optical surface is provided includes a plurality of diamond shapes.

9. The lighting device of claim 6 further provided with a second electroluminescent element arranged so that the second element emits light in an opposite direction.

10. The lighting device of claim 9 wherein the electroluminescent elements are arranged back to back.

11. The lighting device of claim 6 wherein the tube is made of transparent material.

12. The lighting device of claim 6 wherein the tube is made of translucent material.

\* \* \* \* \*